United States Patent
Saylor et al.

(10) Patent No.: US 7,466,827 B2
(45) Date of Patent: Dec. 16, 2008

(54) SYSTEM AND METHOD FOR SIMULATING AUDIO COMMUNICATIONS USING A COMPUTER NETWORK

(75) Inventors: Kase J. Saylor, San Antonio, TX (US);
Gary L. Ragsdale, San Antonio, TX (US); Jimmy R. Gaddy, San Antonio, TX (US); Stephen R. Gray, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 796 days.

(21) Appl. No.: 10/720,779

(22) Filed: Nov. 24, 2003

(65) Prior Publication Data

US 2005/0114144 A1   May 26, 2005

(51) Int. Cl.
*H03G 3/00*   (2006.01)
(52) U.S. Cl. .......................... 381/61; 381/309
(58) Field of Classification Search ............. 381/61–62, 381/77–82, 309, 17–18; 700/94
See application file for complete search history.

(56) References Cited

U.S. PATENT DOCUMENTS

| | | | |
|---|---|---|---|
| 4,281,994 A | 8/1981 | Dell et al. ................... 434/49 |
| 4,781,594 A | 11/1988 | Metcalf ...................... 434/48 |
| 5,009,598 A | 4/1991 | Bennington .................. 434/30 |
| 5,240,416 A | 8/1993 | Bennington .................. 434/30 |
| 5,544,228 A | 8/1996 | Wagner et al. ............... 379/67 |
| 5,616,030 A | 4/1997 | Watson ...................... 434/38 |
| 5,636,283 A * | 6/1997 | Hill et al. ................... 381/17 |
| 5,696,831 A * | 12/1997 | Inanaga et al. .............. 381/309 |
| 6,053,736 A | 4/2000 | Huffman et al. ............. 434/11 |
| 6,077,077 A * | 6/2000 | Geipe ........................ 434/30 |
| 6,078,669 A * | 6/2000 | Maher ........................ 381/17 |
| 6,159,100 A | 12/2000 | Smith ........................ 463/42 |
| 6,241,612 B1 | 6/2001 | Heredia ...................... 463/42 |
| 6,871,176 B2 * | 3/2005 | Choi et al. ................... 704/223 |
| 6,959,094 B1 * | 10/2005 | Cascone et al. .............. 381/86 |
| 2002/0110246 A1 * | 8/2002 | Gosior et al. ................ 381/2 |
| 2003/0120492 A1 * | 6/2003 | Kim et al. ................... 704/270 |
| 2004/0064320 A1 * | 4/2004 | Chrysanthakopoulos et al. ........................ 704/275 |
| 2004/0088169 A1 * | 5/2004 | Smith et al. ................. 704/500 |

* cited by examiner

*Primary Examiner*—Vivian Chin
*Assistant Examiner*—Disler Paul
(74) *Attorney, Agent, or Firm*—Baker Botts L.L.P.

(57) ABSTRACT

A system and method for providing audio communications for a simulation system. A computer network has a server in data communication with client systems. The server receives audio from a transmitting client. It then executes transceiver models and impairment models, which inject effects of audio communications media and equipment into sampled audio data. The server then delivers the "impaired" audio to a receiving client.

30 Claims, 1 Drawing Sheet

SYSTEM AND METHOD FOR SIMULATING AUDIO COMMUNICATIONS USING A COMPUTER NETWORK

TECHNICAL FIELD OF THE INVENTION

This invention relates to the use of computer systems for simulating real world situations, and more particularly to the use of a computer system to simulate audio communications.

BACKGROUND OF THE INVENTION

As the demand for simulation-based training and testing systems increases, so does the demand for more realism. A realistic simulation system should comprise at least three components: visual realism, tactile realism, and aural realism. Many tools are available that are directed to the first two components, but the aural component of realism is often given short shrift. As a result, many simulation systems provide a simulated environment with a great "look and feel", but lack a meaningful aural experience.

As an example, a high level flight simulator might realistically simulate the cockpit of an aircraft and the feeling of flying. However, voices and other sounds attempted to be reproduced in the pilot's headset are not likely to sound like those actually transmitted over a radio channel. In such a system, the trainee pilot's ear is not being trained at the same level as his or her visual and tactile senses.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
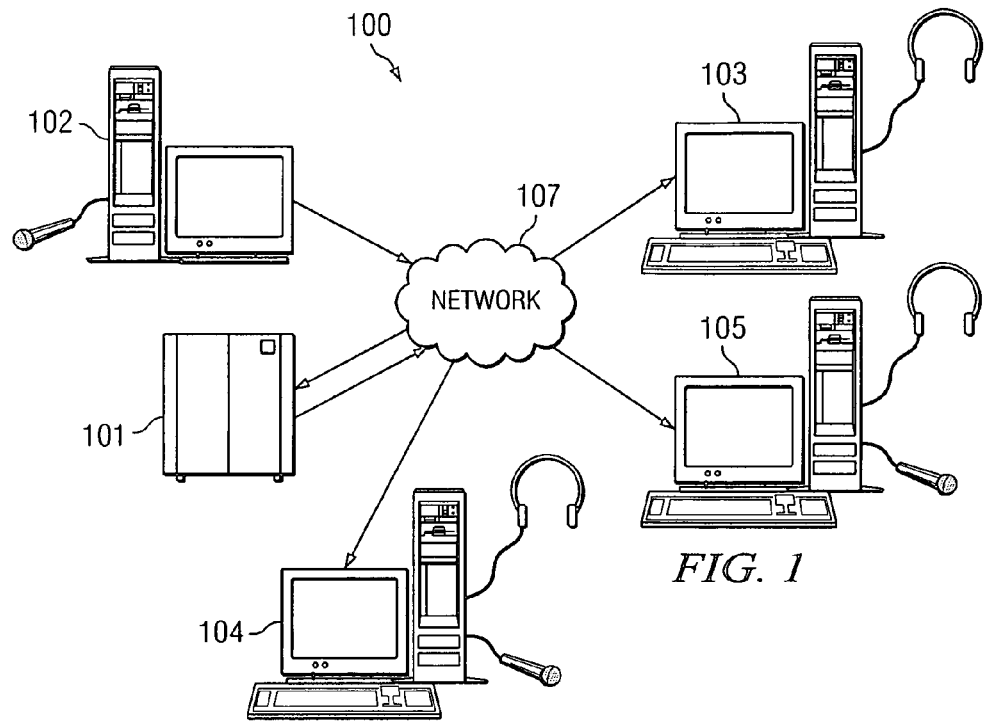
FIG. 1 illustrates a simulation system in accordance with the invention.

FIG. 1 illustrates a system 100 for simulating audio communications in accordance with the invention. The audio simulations provided by system 100 are significant to the simulation industry, but are also applicable in other fields, such as in the communications industry. With respect to the latter, by using discrete modules to simulate communications alternatives, the communications industry can make better decisions about which systems best meet design criteria.

An example of aural realism provided by the invention is the replication of the sound of a UHF channel used in a flight simulation system. In this example, system 100 is used to accurately simulate voices that are received by a pilot over a UHF radio channel.

As explained below, in one embodiment of the invention, the system is a client-server-client system. Any client can be a source and/or a destination. The server routes audio between the clients and introduces impairment effects as prescribed by simulation models and parameters. A source client is used to receive audio communications. The audio input is sampled and delivered to the server where it is filtered and injected with random noise and other effects, using digital signal processing (DSP) models. The impaired voice data is then delivered to a destination client.

In real time applications, the audio distribution is real-time for maintaining the interactive fidelity of a training environment. In playback applications, the audio may be processed and recorded prior to playback. Some applications might use a combination of real-time and playback audio.

Real-time applications may use live participants, with some speaking into microphones and others listening through speakers to audio that is impaired in accordance with the invention. A playback application would permit "virtual participants" to participate in the simulation and deliver impaired audio to one or more live recipients via headphones.

System 100 may provide simulations of various audio transceivers, operating over wireless, metal wired, or fiber optic wired channels, or any combination of these. Each of these transmission mediums has unique audio characteristics, which are modeled by system 100. The simulated transceivers appear in many applications, mobile or stationary. Examples of transceivers includes those associated with aircraft, ground vehicles, or communications centers.

System 100 is a distributed computer network system, having at least one server 101 and a number of client stations 102 and 103. Server 101 receives audio data from one or more transmitter client systems 102, applies DSP models to the data, and delivers the processed audio to one or more receiver client systems 103. Client systems may also be two-way (transceiver) systems, such as client systems 104 and 105 which send and receive audio. Although only four client systems are illustrated, system 100 may handle any number of client systems as is appropriate for its processing capacity.

For purposes of this description, a "transmitter client" may be client system 102 or client system 104 or 105 when they are transmitting audio. Similarly, a "receiver client" may be client system 103 or client system 104 or 105 when they are receiving audio.

In typical applications, such as flight simulation, the system 100 operates in real time with two-way clients. Live participants will transmit and receive audio data, via their respective client systems and the server 101. Any number of participants tuned to the same channel can send and receive audio.

Client systems 102-105 have appropriate hardware and software for sampling input audio and playing received audio data. Client systems may be conventional personal computer type devices, including laptops and PDA's, equipped with conventional off-the-shelf sound cards and player devices, including microphones and speakers. Depending on the application, headphones (as illustrated in FIG. 1) rather than speakers may be used.

Server 101 is equipped with microprocessing devices, programmed to perform the tasks described herein. Server 101 also performs standard computer server functions, such as receiving and satisfying requests for data from clients 102 and 103.

Figure 2:
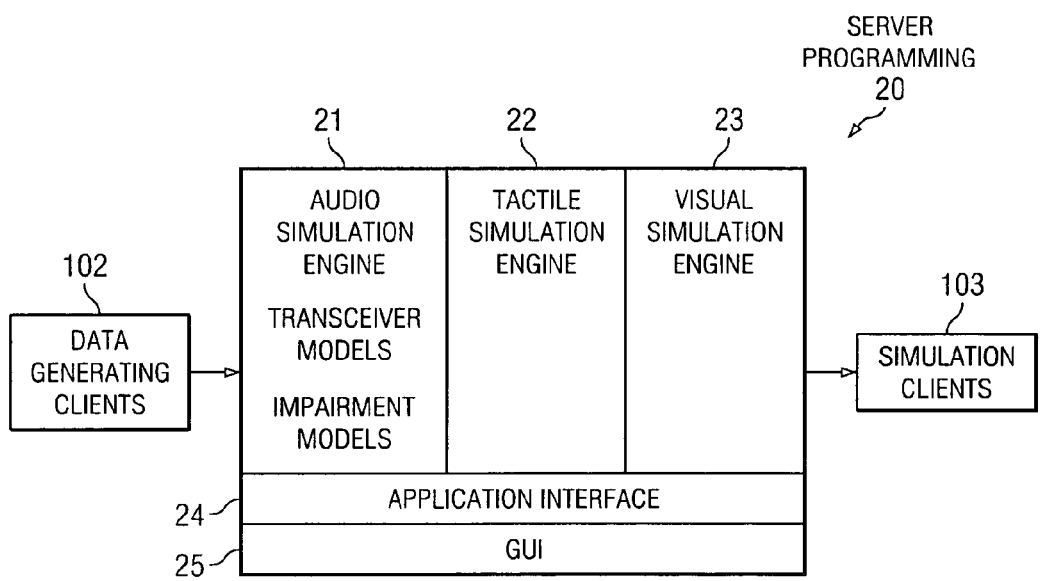
FIG. 2 illustrates the programming architecture residing on the server of FIG. 1.

FIG. 2 illustrates the programming residing on server 101. As illustrated, the processing of audio data is performed by server 101, which relieves client systems 102 and 103 of that processing burden.

In the example of this description, server 101 is in data communication with clients 102 and 103 via an Ethernet connection. Thus, network 104 is a local area network. However, the same concepts could be applied to a wide area network, such as one using a TCP/IP protocol. The communications links of network 104 may be wired or wireless. Each client 102 or 103 is equipped with a network interface card for data communications over network 104. A 100 Mbps Ethernet connection is an example of a suitable data speed. Various methodologies and protocols may be used for communicating the audio data across the network. An example of a suitable protocol is VoIP (voice over Internet Protocol).

Transmitting client 102 receives and stores sampled audio data. As an example, client 102 may be equipped with a microphone and soundcard (printed circuit board) for receiving and sampling (digitizing) spoken words.

Client 102 then delivers the sampled audio data to server 101 via network 104. In the example of this description, data communications are via data packets. Server 101 processes the audio data by applying the simulation models of engine 21.

Server 101 determines which receiver clients 103 are to receive the processed audio data, then delivers the audio data to those clients 103. Client 103 is equipped with a soundcard (printed circuit board), which it uses to convert the processed audio data to analog data, which is played to the user of client 103, using headphones or speakers.

Client systems 102-105 may be conventional computer workstations, having conventional processing and memory capability. As explained above, the special equipment for implementing the present invention includes audio equipment such as speakers, microphones, and sound cards.

Referring specifically to FIG. 2, which illustrates the programming architecture of server 101, server simulation programming 20 resides on server 101. This programming 20 oversees the operation of the audio simulation engine 21 (including impairment models and transceiver models discussed below), application interface 24, and the server-side graphical user interface (GUI) 25. Depending on the sophistication of the simulation programming, the audio simulation engine 21 may be used in conjunction with a tactile simulation engine 22 and/or a visual simulation engine 23.

The transceiver models and impairment models of audio simulation engine 21 are implemented with DSP (digital signal processing) programming. The DSP functions may be implemented with the main CPU of server 101, or optionally, with special DSP devices operating in conjunction with the CPU of server 101.

In general, the transceiver and impairment models of engine 21 are created by analyzing a real world communications system and its effects on transmitted signals. Their processing is used to model characteristics of real world radio communications channels. The processing is then used to impose those characteristics on a signal, so that the signal simulates a signal that was transmitted through those channels. Thus, the model is used to replicate the sound at the output end of a radio communications channel.

Transceiver models model the type of radio or other transceiver being simulated. Typically, both the receiving and transmitting client systems are transceiver systems, but in certain embodiments, a transceiver model could be of a receiver-only or transmitter-only equipment. A transceiver model may be as simple as a bandpass filter. The transceiver power is an example of one parameter to the model.

Transceiver models include models of automatic gain control circuits and squelch circuits. Signal sensitivities (how low a signal can be received) are used for modeling these circuits. Bandpass filters are used to model the frequency response of a transceiver.

Impairment models model the effects of the transmission medium, such as by modeling channel fading, multi-path fading, propagation delay, noise (including Gaussian), Doppler shift effects, and gain control. For wireless communication simulations, in addition to filtering and noise injection, the impairment models also simulate the effects of line-of-sight, propagation losses, signal fading, and other effects characteristic of wireless communications. The impaired audio could include any desired background noise, in addition to the communicated voice audio, such as engine noise, wind noise, artillary noise, etc.

A feature of the invention is that the impairment models may operate dynamically, in response to simulated conditions. For example, for simulating aircraft audio communications, an aircraft may be flying at a certain speed and be a certain distance away from a control tower with which it is communicating. The speed and distance may be used as parameters to the model, which will process the audio data differently depending on these parameters. For purposes of this description, parameters such as speed and distance of a client system (i.e., a simulated aircraft) are referred to as "dynamic simulated entity data".

Multipath impairment models use as input, the velocity of the entity (aircraft, vehicle, etc.) that is receiving the transmission and the radio frequency. Doppler effect impairment models use the velocity and the angle between the transmitter and receiver. Channel noise models use an additive Gaussian white noise generator whose level is controlled by the path gain. Path gain is represented as a fraction of signal power based on the distance between the transmitter and receiver, the power of the transmitter, and the carrier frequency.

As an alternative to sampling real world audio input, the models of server 101 could be used to generate audio data. Various techniques for artificially generating voice and other audio sounds could be used.

The application program interface (API) 24 controls the interaction of the audio simulation engine 21 and the visual and tactile simulation engines 22 and 23. The API 24 operates in conjunction with the tactile simulation engine 22 so that tactile entries made at a client system 102-105 may be used to control the audio simulations. For example, an operator at a client system may select a particular simulation environment, which includes a particular type of transceiver. Additional tactile selections by the operator could include channel and volume settings or any other type of control found on a radio or other audio equipment. The API 24 may also be used to provide visual displays to correspond with the tactile selections and the audio environment. For example, a visual display of a radio console could be used to depict controls (such as switches, knobs, and indicator lights) for volume, noise level, signal strength, or other audio qualities, or to depict current levels of these qualities.

In the case where programming 20 includes visual and tactile simulation engines 22 and 23, client systems 103-105 would then have appropriate graphical user interfaces for providing these visual displays and receiving tactile inputs. However, a feature of the invention is that the audio processing of engine 21 is performed at the server, which permits system 100 to be implemented with a minimum of processing at client systems 102-105. Specifically, for purposes of implementing the audio simulation provided by engine 21, client systems 102-105 need only a sound card, and speaker and/or microphone and whatever software is required to receive and play audio data.

The interrelated audio, visual, and tactile simulations described in the preceding paragraph relate to simulated communications and related hardware. System 100 and programming 20 may be further enhanced to include (or work in conjunction with) additional simulation not related to audio. For example, in the case of a flight simulator, these additional controls might include flight controls and cockpit views.

Graphical user interface (GUI) 25 is used to configure and control the simulation engines 21-23. A system administrator will specify the models used for a particular simulation, as well as various impairment parameters, and other operational characteristics.

System 10 and its programming can be fully implemented using a combination of conventional computing devices and conventional programming languages and tools. The programming described herein can be implemented with C++ language to enhance its ability to interface with existing non-audio simulation systems.

What is claimed is:

1. A method for providing simulated audio communications, which simulate an RF transmission using a selected type of RF transceiver and a selected type of RF transmission medium, to a simulation system, comprising the steps of:
    linking as a data network, a server and two or more client systems;
    storing at least one transceiver model, accessible by the server, wherein the transceiver model stores data representing audible transceiver effects of the selected RF transceiver;
    storing at least one impairment model, accessible by the server, wherein the impairment model stores data representing audible transmission effects of the selected RF transmission medium;
    sampling voice input at a first client system, resulting in sampled voice data;
    transmitting the sampled voice data to the server;
    using the server to add additional audio data to the sampled voice data, by applying at least one transceiver model and at least one impairment model, wherein the transceiver model injects transceiver effects into the sampled voice data and the impairment model injects transmission effects into the sampled voice data, thereby resulting in processed audio data;
    wherein one of the transmission effects is noise due to the transmission medium;
    wherein at least one of the transceiver effects operates to limit amplitude of the audio data due to transceiver sensitivity;
    transmitting the processed audio data to a second client system.

2. The method of claim 1, wherein the simulation system provides tactile simulation, and further comprising the steps of using tactile simulation to select a transceiver, and of transmitting data representing the selected transceiver to the server such that the selected transceiver corresponds to the transceiver model.

3. The method of claim 1, wherein the simulation system provides a visual simulation, and further comprising the step of providing a visual display corresponding to control of one or more audio qualities of the audio communications.

4. The method of claim 1, wherein the simulation system provides a visual simulation, and further comprising the step of providing a visual display depicting one or more audio qualities of the audio communications.

5. The method of claim 1, wherein the transceiver model represents at least a type of receiver, transmitter, or transceiver.

6. The method of claim 1, wherein the transceiver model represents at least the transceiver power.

7. The method of claim 1, wherein the impairment model represents one or more attributes from the following group: channel fading, multi-path fading, propagation delay, noise (including Gaussian), Doppler shift effects, and gain control.

8. The method of claim 1, wherein the transceiver model represents a wireless receiver and the impairment model represents one or more attributes from the following group: filtering, noise injection, line-of-sight effects, propagation losses, and signal fading.

9. The method of claim 1, wherein either the first client system or the second client system or both are transceiver systems.

10. The method of claim 1, wherein the impairment model uses dynamic simulated entity data, such that the audio data is modified according to simulated relative movement of at least one of the client systems.

11. The method of claim 10, wherein the dynamic simulated entity data is velocity data of the first client system or the second client system or both.

12. The method of claim 10, wherein the dynamic simulated entity data is the distance between the first client system and the second client system.

13. The method of claim 1, wherein the impairment model is a multipath model, based on velocity of the second client system and radio frequency.

14. The method of claim 1, wherein the impairment model is a Doppler effects model, based on velocity of the second client system and the angle between the first client system and the second client system.

15. The method of claim 1, wherein the impairment model is a channel noise model, based on Gaussian noise generator output data whose level is controlled by path gain.

16. A system for providing simulated audio communications, which simulate an RF transmission using a selected type of RF transceiver and a selected type of RF transmission medium, comprising:
    a data network having a server and two or more client systems;
    wherein a first client system is configured to sample voice input, resulting in sampled voice data, and to transmit the sampled voice data to the server;
    a database for storing at least one transceiver model, accessible by the server, wherein the transceiver model stores data representing audible transceiver effects of the selected RF transceiver; and for storing at least one impairment model, accessible by the server, wherein the impairment model stores data representing audible transmission effects of the selected RF transmission medium;
    wherein the server is configured to add additional audio data to the sampled voice data, by applying at least one transceiver model and at least one impairment model, wherein the transceiver model injects radio transceiver effects into the sampled voice data and the impairment model injects radio transmission effects into the sampled voice data, thereby resulting in processed audio data; and to transmit the processed audio data to a second client system;
    wherein at least one of the radio transmission effects is noise due to the transmission medium;
    wherein at least one of the transceiver effects operates to limit amplitude of the audio data due to transceiver sensitivity;
    wherein the second client system is configured to receive the processed audio data.

17. The system of claim 16, wherein the server further provides tactile simulation data to the second client system, such that an operator of the second client system may select a transceiver, and wherein the second client system transmits data representing the selected transceiver to the server such that the selected transceiver corresponds to the transceiver model.

18. The system of claim 16, wherein the server further provides visual simulation data to the second client system, such that the second client system provides a visual display corresponding to control of one or more audio qualities of the audio communications.

19. The system of claim 16, wherein the simulation system provides a visual simulation, and further comprising the step of providing a visual display depicting one or more audio qualities of the audio communications.

20. The system of claim 16, wherein the transceiver model represents at least a type of receiver, transmitter, or transceiver.

21. The system of claim 16, wherein the transceiver model represents at least the transceiver power.

22. The system of claim 16, wherein the impairment model represents one or more attributes from the following group: channel fading, multi-path fading, propagation delay, noise (including Gaussian), Doppler shift effects, and gain control.

23. The system of claim 16, wherein the transceiver model represents a wireless receiver and the impairment model represents one or more attributes from the following group: filtering, noise injection, line-of-sight effects, propagation losses, and signal fading.

24. The system of claim 16, wherein either the first client system or the second client system or both are transceiver systems.

25. The system of claim 16, wherein the impairment model uses dynamic simulated entity data.

26. The system of claim 25, wherein the dynamic simulated entity data is velocity data of the first client system or the second client system or both.

27. The system of claim 25, wherein the dynamic simulated entity data is the distance between the first client system and the second client system.

28. The system of claim 16, wherein the impairment model is a multipath model, based on velocity of the second client system and radio frequency.

29. The system of claim 16, wherein the impairment model is a Doppler effects model, based on velocity of the second client system and the angle between the first client system and the second client system.

30. The system of claim 16, wherein the impairment model is a channel noise model, based on Gaussian noise generator output data whose level is controlled by path gain.

* * * * *